US005153443A

United States Patent [19]

Nishijima et al.

[11] Patent Number: 5,153,443

[45] Date of Patent: Oct. 6, 1992

[54] ARRANGEMENT FOR DETECTING AN OPAQUE LABEL AREA ON A TRANSPARENT ENVELOPE

[75] Inventors: Yasuo Nishijima; Tokuro Hamada; Takeshi Okamura, all of Tokyo, Japan

[73] Assignee: NEC Corporation, Tokyo, Japan

[21] Appl. No.: 577,707

[22] Filed: Sep. 5, 1990

[30] Foreign Application Priority Data

Sep. 5, 1989 [JP] Japan ................................ 1-230791

[51] Int. Cl.[5] ........................ G01N 21/86; G06K 9/04

[52] U.S. Cl. ..................................... 250/561; 209/900

[58] Field of Search ....................... 250/557, 560, 561; 209/584, 900; 382/1, 48

[56] References Cited

U.S. PATENT DOCUMENTS

| | | | |
|---|---|---|---|
| 4,013,999 | 3/1977 | Erwin et al. | 382/48 |
| 4,034,341 | 7/1977 | Isono et al. | 209/584 |
| 4,158,835 | 6/1979 | Miura et al. | 209/900 |
| 4,845,761 | 7/1989 | Cate et al. | 382/48 |

FOREIGN PATENT DOCUMENTS

| | | | |
|---|---|---|---|
| 1126574 | 9/1968 | United Kingdom | 382/48 |
| 1126603 | 9/1968 | United Kingdom | 382/48 |

*Primary Examiner*—David C. Nelms

*Assistant Examiner*—John R. Lee

*Attorney, Agent, or Firm*—Sughrue, Mion, Zinn, Macpeak & Seas

[57] ABSTRACT

For use together with a device for detecting a plurality of information positions where postal information pieces are described, an arrangement is for detecting one of the information positions that is described on an opaque label attached to a transparent envelope. Responsive to a regularly reflected beam from the opaque label, a label positon detector detects a label position where the opaque label is attached to the transparent envelope to produce a label position signal representative of the label position. Responsive to the label position signal, a selector selects the above-mentioned one of the information position.

4 Claims, 5 Drawing Sheets

ARRANGEMENT FOR DETECTING AN OPAQUE LABEL AREA ON A TRANSPARENT ENVELOPE

BACKGROUND OF THE INVENTION

This invention relates to an arrangement for use in a mail sorting machine.

In general, use is made in a mail sorting machine of an installation for detecting a postal code number or a zone improvement program code described on each mail item, such as a postcard or a sealed letter. The detection is possible when other postal information pieces are scarce on the mail item except an addressee's name and address including the addressee's postal code number and when an information position of the postal code number is strictly defined on the mail item.

Nowadays, a transparent envelope is often used to make a commercial message or to allow postal information on an enclosed letter to be visible. The transparent envelope is provided by a substantially transparent medium, such as a paraffin or cellophane film.

The addressee's address is described on an opaque label attached to the transparent envelope.

On detecting the postal code number or ZIP (Zone Improvement Program) code on the opaque label, it is necessary to first detect the opaque label attached to the transparent envelope. Subsequently, the postal code number or ZIP code must be selected from various other information including the commercial message and/or the postal information pieces.

In U.S. Pat. No. 4,158,835, a device is proposed for preliminarily detecting information positions of the respective postal information pieces, deriving the postal code numbers of the addressee's addresses from the detected information positions, and sorting the mail items in accordance with the derived postal code numbers. However, this device cannot be available for detecting the postal information pieces from the transparent envelope because consideration is made in the above-referenced patent only about a mail item having a transparent window.

SUMMARY OF THE INVENTION

It is therefore an object of this invention to provide an arrangement capable of detecting the position of information on an opaque label attached to a transparent envelope.

It is a specific object of this invention to provide an arrangement, which is capable of carrying out the detection when the opaque label area substantially does not regularly reflect a light beam while a remaining area does.

This invention is for use with a device for detecting the position of various postal information. The device includes illuminating means for illuminating mail items to make the mail items produce irregularly reflected beams and information detecting means supplied with the irregularly reflected beams for detecting the position of various information as detected information positions to produce information position signals. The arrangement is for detecting one position of the information that is described on an opaque label attached to a transparent envelope.

According to this invention, the arrangement comprises first means responsive to the regularly reflected beam for producing a label position signal and second means supplied with the label position signal and the information position signals for selecting one of the information position signals.

DESCRIPTION OF THE PREFERRED EMBODIMENTS

Figure 1:
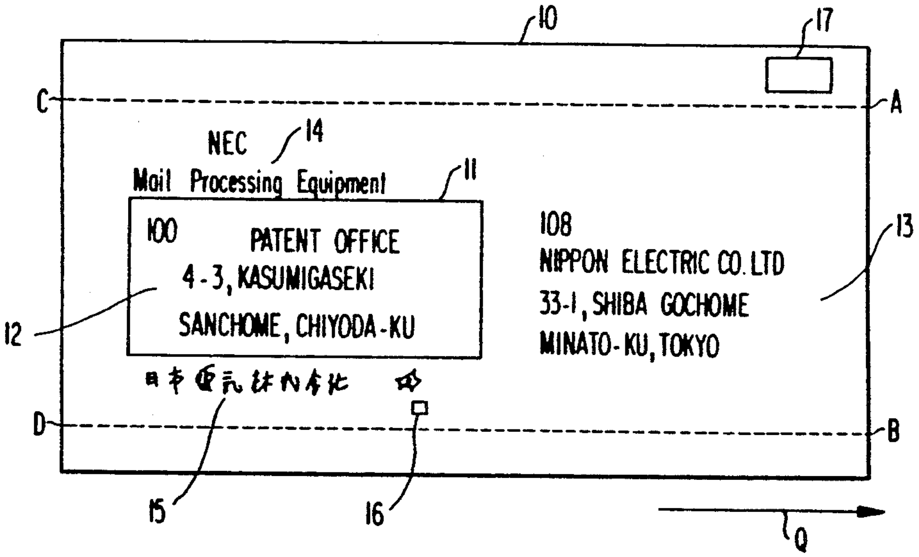
FIG. 1 exemplifies a mail item having a label area and a remaining area.

Referring to FIG. 1, a mail item 10 has an opaque label area 11 and a remaining area. The remaining area is provided by a substantially transparent film, such as a paraffin or a cellophane film and forms a transparent envelope. On the mail item 10, various postal information pieces are printed or described which include an addressee's name and address 12, a sender's name and address 13, a commercial message 14, a print 15 of the sender's name in a different manner, and an ornament or a symbol pattern 16. A stamp 17 is affixed to the mail item 10. It is to be noted that the addressee's postal information pieces 12 including a postal code number is described on the opaque label area 11 adhered to the transparent film. A plurality of mail items including the mail item 10 are successively fed along a predetermined path of a mailing sorting machine as symbolized by an arrow Q. Therefore, each of the mail items has a leading edge on the right-hand side of the illustration and a trailing edge on the left-hand side. As will be described later, optical scanning is carried out all over a rectangular area defined by four corner points A, B, C, and D. Two of the points, namely, A and B, are present on the leading edge while the remaining points C and D, on the trailing edge. The points A and C are nearer to the top of the mail item 10 while the points B and D, nearer to the bottom.

It should be noted that the opaque label area 11 has a low reflection coefficient for an optical beam as compared with the remaining area and therefore the opaque label area 11 does not substantially regularly reflect the beam due to such a low reflection factor. It is also to be noted that the beam may not necessarily be invisible light.

Figure 2:
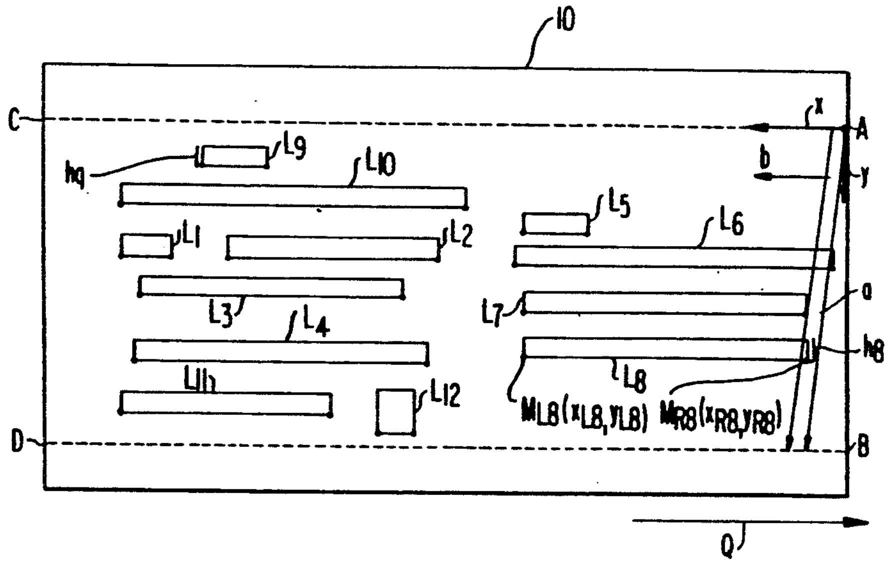
FIG. 2 shows segment patterns of postal information pieces described on the mail item illustrated in FIG. 1.

Referring to FIG. 2, description will be made about the principles of this invention. Point A is a predetermined point on the leading edge. The predetermined point is used as an origin of a coordinate system. Merely for simplicity of description, it is surmised that the coordinate system is a rectangular x-y coordinate system having an x-axis in a sense opposite to a sense Q of a transport direction of the mail items and a y-axis which is perpendicular to the x-axis and directed towards the bottom of the figure. The position of the postal information pieces 12 through 16 are equivalently defined by segment patterns $L_J$ (J = 1, 2, . . . , and 12). The patterns $L_1$ through $L_4$ represent the addressee's name and address 12 described on the opaque label area 11 while the patterns $L_5$ through $L_8$, represent the sender's name and address 13 printed on the remaining area. The patterns $L_9$ and $L_{10}$ give the commercial message 14, while the patterns $L_{11}$ and $L_{12}$ give the sender's name 15 and the ornament or symbol 16, respectively.

The illustrated mail item 10 is scanned by an optical scanner along a predetermined line intersecting the direction determined by Q. More particularly, the scanner optically scans the mail item 10 by light, starting at the point A, and moves towards the bottom in a first direction a. As the mail item 10 is fed, the optical scanning successively moves in a second direction b. Such optical scanning operation brings about light reflected from the mail item 10. It is possible to detect the segment patterns $L_J$ and to determine right bottom corner points $M_{RJ}(x_{RJ}, y_{RJ})$, left bottom corner points $M_{LJ}(x_{LJ}, y_{LJ})$, and heights $h_J$ of the respective patterns $L_J$ by monitoring the reflected light.

Figure 3:
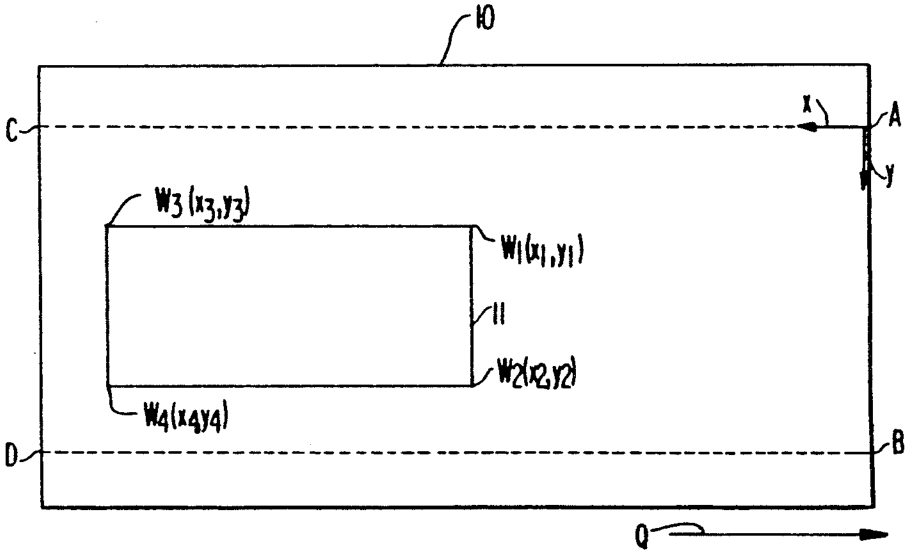
FIG. 3 shows a manner of defining a label position of the label area on the mail item depicted in FIG. 1.
Figure 4:
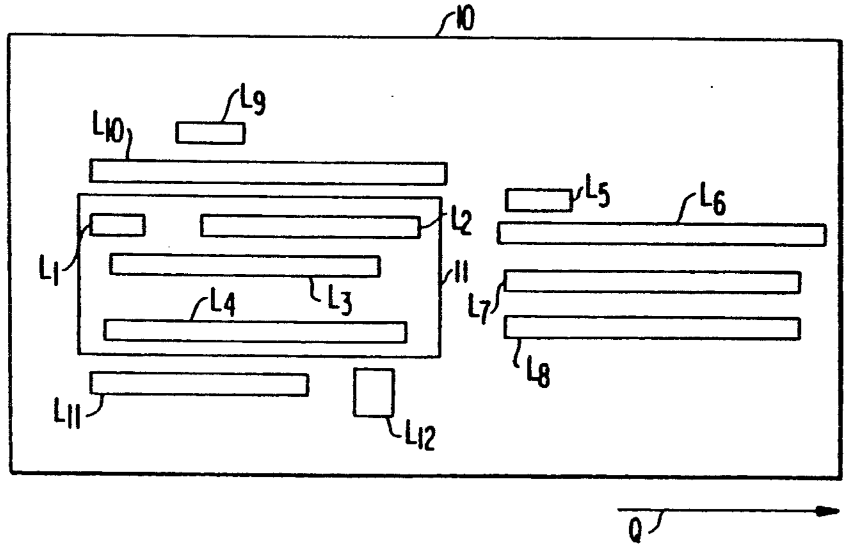
FIG. 4 is for illustrating the segment patterns located on the label area and on the remaining area.

Turning to FIGS. 3 and 4, further detection is made concerning the position of information after the above-mentioned points are determined.

According to a preferred aspect of this invention, the determination is carried out by detecting with reference to the x-y coordinate system a right top corner point $W_1(x_1, y_1)$ of the opaque label area 11, a right bottom corner point $W_2(x_2, y_2)$, a left top corner point $W_3(x_3, y_3)$, and a left bottom corner point $W_4(x_4, y_4)$. The corner points $W_1$ and $W_2$ are present on a front edge of the opaque label area 11 while the remaining corner points $W_3$ and $W_4$, on a rear edge thereof. The segment patterns $L_1$ through $L_4$ which are described on the opaque label area 11 and which define the information positions for the addressee's postal information pieces 12 (FIG. 1) are selected by the use of the corner points $W_1$ through $W_4$ from the segment patterns $L_J$ determined by the device disclosed in U.S. Pat. No. 4,034,341.

Figure 5:
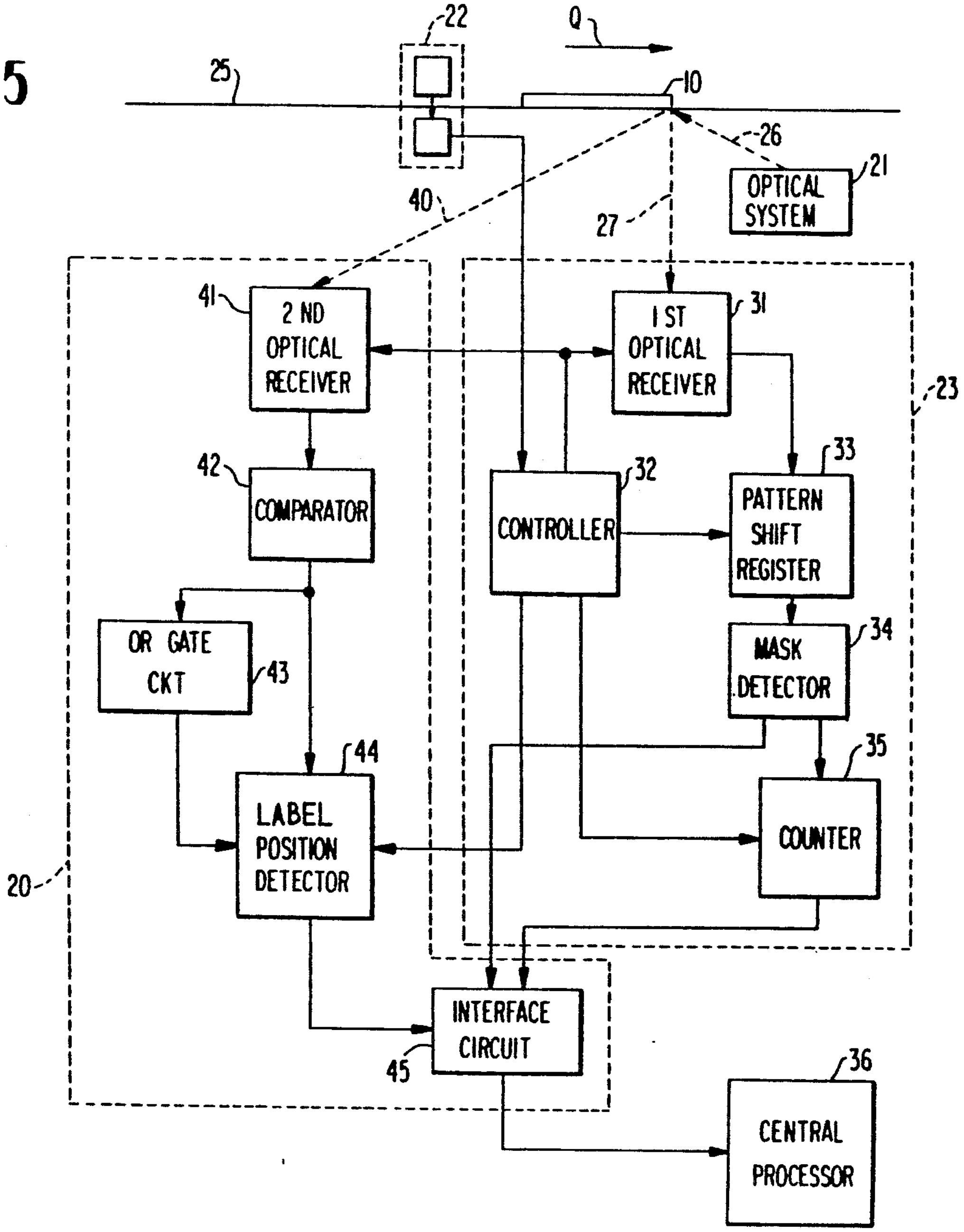
FIG. 5 shows in blocks an arrangement according to a preferred embodiment of this invention together with a conventional device for generally detecting the segment patterns.

Referring now to FIG. 5, an arrangement 20 according to a preferred embodiment of this invention is for use in combination with a device comprising an optical system 21, a point signal producing unit 22, and an information position detecting unit 23 as taught in U.S. Pat. No. 4,034,341. As described with reference to FIG. 1, the mail items 10 are successively fed along a predetermined path 25 in a predetermined direction Q at a substantially predetermined speed. The optical system 21 illuminates the mail item 10 by a beam 26 of light along a line predetermined relative to the path 25 to preferably perpendicularly intersect the direction Q. Responsive to the leading edge, the point signal producing unit 22 produces a point signal indicative of the point A (FIGS. 1 through 3). The opaque label area 11 and the remaining area irregularly reflect the light incident on the mail item 10 to provide a beam 27 of the reflected light. A first optical receiver 31 of the information position signal producing unit 23 is positioned adjacent to the predetermined path 25 to receive the irregularly reflected light beam 27. Supplied with the point signal, a controller 32 of the unit 23 generates a starting pulse followed by a sequence of sampling pulses. Responsive to the starting and the sampling pulses, the first optical receiver 31 equivalently carries out optical scanning of the rectangular area-ABCD. Quantized signals that two-dimensionally quantize the area ABCD are produced by the cooperation of the sampling pulses and the lines of optical scan and take logic "1" and "0" values according to the postal information pieces 12 through 16 (FIG. 1) described on the opaque label area and on the remaining area.

The controller 32 series as a clock pulse generator which produces a sequence of clock pulses, one pulse for each line of scan. Stepped by the sampling and clock pulses, a pattern shift register 33 of the unit 23 stores the quantized signals representative of two-dimensionally quantized patterns similar to the respective postal information pieces 12 through 16. Supplied with the quantized signals stored in the pattern shift register 33, a mask detector 34 determines whether or not each quantized pattern has an area sufficient for a postal information piece to produce a first, a second, and a third signal corresponding to the right top end of the quantized pattern, the right bottom end, and the left bottom end, respectively. Responsive to the first and the second signals, a counter 35 counts the sampling pulses to determine the heights $h_J$ of the respective segment patterns $L_1$ through $L_{12}$. Responsive also to the second and the third signals, the counter 35 counts the clock and sampling pulses to determine the coordinates $x_{RJ}$, $y_{RJ}$, $x_{LJ}$, and $y_{LJ}$. The counter 35 thus produces information position signals representative of the determined coordinates and heights. The quantized signals of the mask detector 34 and the information position signals are supplied from the information position signal producing unit 23 to a central processor 36 for reading the postal information pieces 12 through 16.

Figure 6:
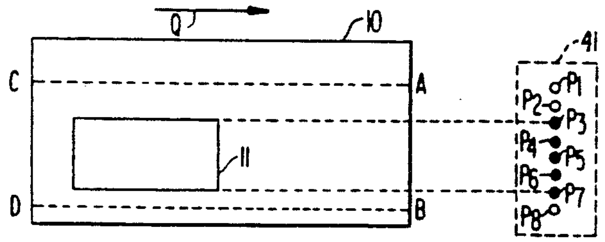
FIG. 6 schematically shows a row of photocells used in an arrangement according to this invention together with the mail item illustrated in FIG. 1.

Referring to FIG. 5 again and to FIG. 6, the opaque label area 11 of the mail item 10 is capable of approximately regularly reflecting the light beam 26 incident thereon to provide a beam 40 of the approximately regularly reflected light. In the manner described above, the opaque label area 11 reflects the beam 26 as irregularly reflected light. It should be noted, however, that the irregularly reflected light includes a portion that is approximately regularly reflected and can be called a regularly reflected beam indicated at 40. The arrangement 20 comprises a second optical receiver 41 comprising, in turn, a row of photoelectric conversion elements P1 through P8, such as photocells or phototransistors, parallel to the predetermined line of scan so as to receive the regularly reflected light beam 40. Supplied with the starting pulse, the second optical receiver 41 is put into operation. As a result, each of the photoelectric conversion elements produces a label detection signal in response to the regularly reflected beam 40 and otherwise a spurious signal. The photoelectric conversion elements P3 through P7 hatched in FIG. 6 produce the label detection signals while the remaining photoelectric conversion elements P1, P2, and P8 produce the spurious signals. As will readily be understood with reference to FIG. 6, two of the hatched photoelectric conversion elements P3 and P7 disposed nearest to both ends, respectively, correspond to the width of the label area 11, namely, the dimension thereof perpendicular to the direction Q. The arrangement 20 further comprises a comparator 42. In this manner, which will later be described, the comparator 42 is for comparing the signals supplied from the second optical receiver 41 with a threshold signal to simultaneously produce logic "1" and "0" signals in response to the label detection signals and the spurious signals, respectively. In other words, the comparator 42 produces output signals in response to the respective label detection signals alone. Responsive to the simultaneously produced logic "0" and/or "1" signals, an OR gate circuit 43 of the arrangement 20 produces a single logic "1" signal so long as the opaque label area 11 travels through the predetermined line.

Reference to FIG. 5 will be continued. Supplied with the logic "0" and/or "1" signals from the comparator 42, a label position detector 44 determines the width of the label area 11 to produce a width signal representative of the determined width. Responsive to the single logic "1" signal and the starting and clock pulses, the detector 44 determines a first interval (L-F) shown in FIG. 7 between a first instant L determined by the starting pulse that is followed by the comparator output signals and a second instant F determined by the occurrence of the single logic "1" signal to produce an interval signal representative of the first interval or the abscissae of the right top and bottom corner points $W_1$ and $W_2$ of the label area 11. Also, the detector 44 determines a second interval (F-R) between the second instant and a third instant R determined by the disappearance of the single logic "1" signal to produce a rear edge signal representative of the abscissae of the left top and bottom corner points $W_3$ and $W_4$. It will be readily understood that the interval signal and the rear edge signal cooperate to provide a length signal representative of the length of the label area 11, namely, the distance between the front edge and the rear edge. The width, interval, and length signals provide a label position signal. With reference to the signals supplied from the mask detector 34 and the label position detector 44, an interface circuit 45 of the arrangement 20 selects the information position signals for the segment patterns $L_1$ through $L_4$ from all the information position signals supplied from the counter 35 to supply the selected information position signals to the central processor 36 to make the latter read the postal information pieces 12 described inside the label area 11. Preferably, the interface circuit 45 carries out the selection by picking up the information positions of the segment patterns $L_4$ through $L_{12}$ from all the information positions and cancelling the picked up information positions from the latter information positions to leave the information positions for the segment patterns $L_1$ through $L_4$. It is possible to resort to the software for the central processor 36 rather than to the interface circuit 45.

Figure 7:
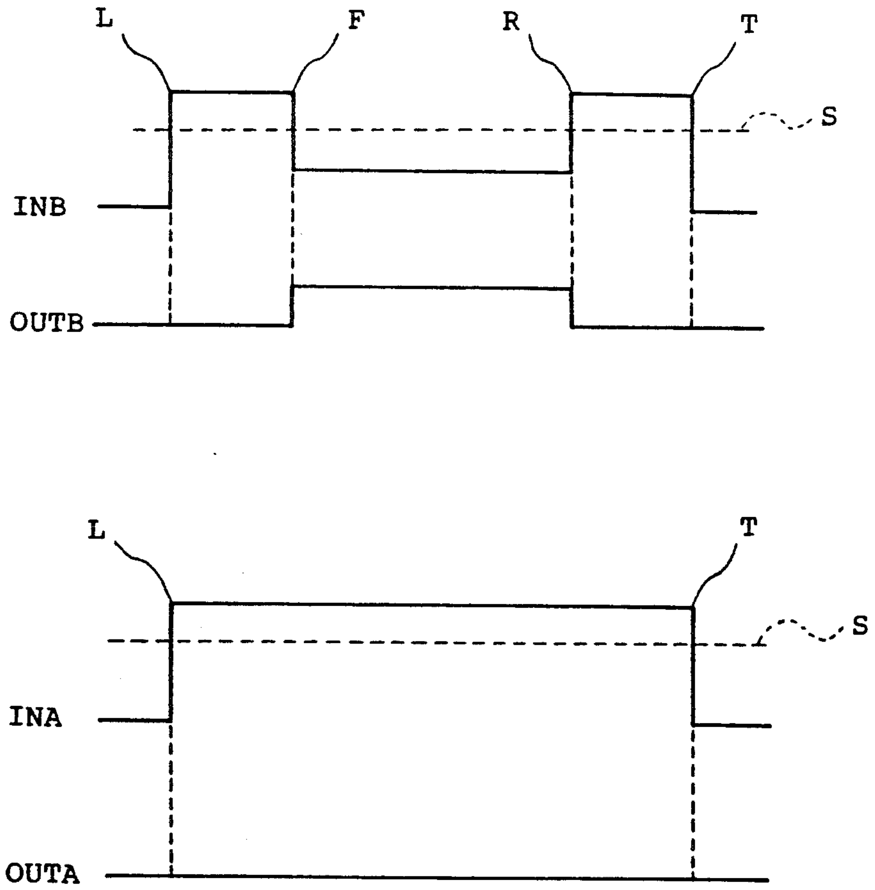
FIG. 7 shows a few signals appearing in the arrangement according to the preferred embodiment.

Referring to FIG. 7, a first input signal INA is supplied to the comparator 42 (FIG. 5) from each of the unhatched photoelectric conversion elements P1, P2, and P8 (FIG. 6) and is compared by the comparator 42 with a threshold level S of the threshold signal. The input signal INA exceeds the threshold level S at a first instant L at which the leading edge of the mail item 10 passes through the predetermined line. The input signal INA rises at another instant at which the trailing edge passes through the line. Responsive to the input signal INA, the comparator 42 produces a logic "0" signal OUTA as shown in FIG. 7. A second input sigal INB is also supplied to the comparator 42 from each of the hatched photoelectric conversion elements P3 through P7 and is compared with the threshold level S. The second input signal INB becomes lower than the threshold level S at a second instant F at which the front edge of the opaque label area 11 is scanned. The second input signal INB becomes higher than the level S at a third instant R at which the rear edge of the opaque label area 11 is scanned. A comparator output signal OUTB takes a logic "1" value during the second interval between the instants F and R. This shows that the comparator output signal OUTB takes the logic "1" value while the opaque label area 11 is being scanned.

Figure 8:
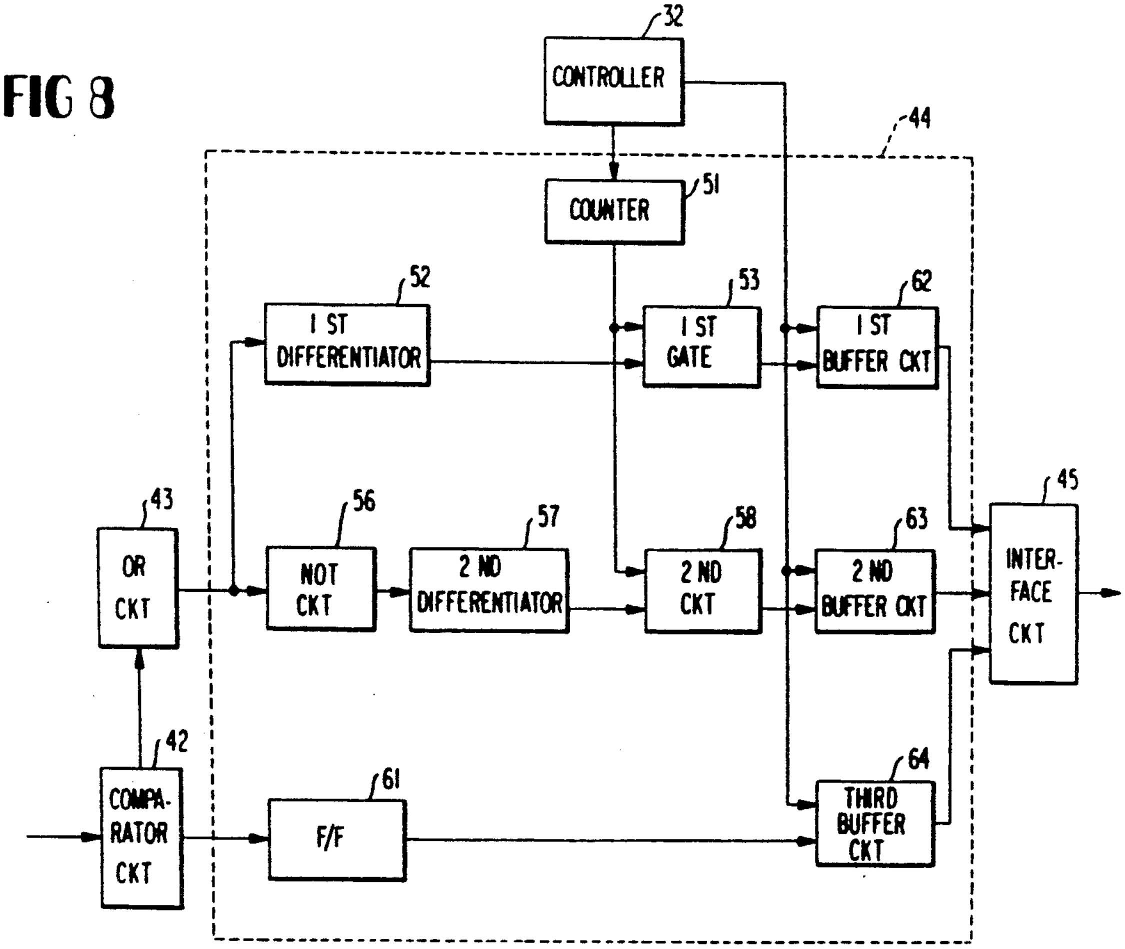
FIG. 8 is a block diagram of a label position detecting unit preferably used in the arrangement according to this invention.

Referring to FIG. 8, it is preferred that the label position detector 44 comprises a first circuit section which is responsive to the single logic "1" signal and the starting and clock pulses and which produces the interval signal in a manner to be described below. The first circuit section comprises a counter 51 reset by the starting pulse to count the clock pulses and to produce a count signal representative of the count of the clock pulses, a first differentiator 52 for differentiating the single output signal supplied from an OR gate circuit 43 to produce a first pulse at the second instant F, and a first gate circuit 53 connected to the counter 51 and enabled by the first pulse to allow the count signal to pass therethrough. The count signal passed through the first gate circuit 53 is representative of the count for the first interval (L-F). It should be noted in connection with the above that the controller 32 additionally serves as a reset pulse generator for generating the starting pulse as a reset pulse.

A second circuit section is connected to the first circuit section to produce the length signal in response to the single logic "1" signal. The second circuit section comprises a NOT circuit 56 for inverting the single logic "1" signal, a second differentiator 57 for differentiating the inverted logic "1" signal to produce a second pulse at the third instant R, and a second gate circuit 58 connected to the counter 51 and enabled by the second pulse to allow the count signal to pass therethrough. The count signal passed through the second gate circuit 58 is representative of the count for a sum of the first (L-F) and the second (F-R) intervals.

A third circuit section comprises a plurality of flip-flop circuits depicted by a single block 61 in correspondence to the respective photoelectric conversion elements P1 through P8 (FIG. 6). The flip-flop circuits 61 are set by the logic "1" signals supplied from the comparator 42 to produce the width signal. It is to be noted here that the controller 32 produces an end pulse when the trailing edge of the mail item 10 passes through the predetermined line. The preferred label position detector 44 further comprises three buffer circuits 62, 63, and 64 supplied with the end pulse and connected to the first through third circuit sections, respectively. The interval, length, and width signals are stored in the buffer circuits 62 through 64 and produced as the label position signal in response to the end pulse.

With reference to FIGS. 1 through 8, the opaque label area 11 has been presumed to be rectangular. For an opaque label area of an elliptic shape or the like, the preferred label position detector 44 produces a length signal representative of a distance between a point nearest on the periphery of the opaque label area to the leading edge and another point nearest to the trailing edge and a width signal representative of another distance between a third point nearest on the periphery to the top edge of the mail item and a fourth point nearest to the bottom. The label position detector 44 may be similar in structure to the counter 35 of the information position detecting unit 23 which produces signals representative of the coordinates $(x_1, y_1)$, $(x_2, y_2)$, $(x_3, y_3)$, and $(x_4, y_4)$ of the corner points $w_1$ through $w_4$ of the rectangular opaque label area 11 in response to signals supplied from the controller 32, the mask detector 34, the OR gate circuit 43, and the comparator 42.

While this invention has thus far been described in conjunction with preferred embodiments thereof, it is now readily apparent that it may be possible to modify the embodiments in various manners. For example, the flip-flops 61 of the arrangement 20 may be reset either by the starting or the end pulse. The arrangement 20 may comprise a separate controller responsive to the point signal for producing a separate starting pulse at an instant different from the instant of production by the illustrated controller 32 of the above-mentioned starting pulse, a sequence of the clock pulses following the separate starting pulse, and the end pulse. When use is made of the preferred label position detector illustrated with reference to FIG. 8, the separate controller need not produce the sampling pulses. With the separate controller used, the illustrated controller 32 need not produce the end pulse. It is possible to use the end pulse for resetting the counter 35 of the information position detecting unit 23. The second optical receiver 41 may comprise a row of photoelectric conversion elements as exemplified in FIG. 6 with the elements supplied with the sampling pulses to equivalently carry out optical scanning of the predetermined line. In this event, the comparator 42 may compare the sequentially produced label detection and/or spurious signals, one at a time, with the threshold signal to successively produce the logic "0" and/or "1" signals. It is, however, necessary under the circumstances to interpose between the receiver 41 and the OR gate circuit 43 a memory circuit (not shown) for memorizing the label detection and/or spurious signals sequentially produced for each of the scanning lines.

What is claimed is:

1. An arrangement for use together with a device for detecting a plurality of information positions where postal information pieces are described, said device including illuminating means for illuminating mail items to make said mail items produce irregularly reflected beams and information detecting means supplied with said irregularly reflected beams for detecting said information positions to produce information position signals, said arrangement being for detecting one of said information positions that is described on an opaque label attached to a transparent envelope, said illuminating means making said mail items produce a regularly reflected beam from said opaque label, said arrangement comprising:

first means responsive to said regularly reflected beam for producing a label position signal; and second means supplied with said label position signal and said information position signals for selecting said one of the information position signals.

2. An arrangement as claimed in claim 1, said opaque label having a rectangular shape, a length in a predetermined direction, and a width transversely of said predetermined direction, said illuminating means illuminating said mail items along a plurality of scanning lines which intersect said predetermined direction, wherein said first means comprises:

an optical receiver for producing label detection signals in response to spurious signals and to said regularly reflected beam;

a comparator for selectively comparing said detection signals and said spurious signals supplied from said optical receiver with a predetermined threshold level signal to produce logic "1" signals in response to said label detection signals and otherwise produce logic "0" signals in response to said spurious signals;

an OR gate circuit connected to said comparator for producing output signals in response to said logic "1" signals so long as said label is illuminated along at least one of said scanning lines; and label position detector for producing a length signal representative of said length in response to said output signals and for producing a width signal representative of said width in response to said logic "1" signals, said length and width signals providing said label position signal.

3. An arrangement as claimed in claim 2, said transparent envelope having a leading edge, one of points in said leading edge being scanned at a first instant for each of said scanning lines, wherein said label position detector comprising:

first circuit means connected to said OR gate circuit for determining a first interval between said first instant and a second instant where at least one of said output signals occurs to produce an interval signal representative of said first interval;

second circuit means connected to said OR gate circuit and said first circuit means for determining a second interval between said second instant and a third instant of disappearance of all of said output signals to produce said length signal representative of said length;

third circuit means connected to said comparator for determining a sequence of the single logic "1" signals at one of said scanning lines to produce said width signal representative of said width; and buffer means connected to said first through said third circuit means for producing said label position signal with reference to said interval, length, and width signals at a predetermined instant following said third instant.

4. An arrangement as claimed in claim 3, said arrangement including a clock pulse generator for generating a sequence of clock pulses and a reset pulse generator for generating a reset pulse at said first instant for each of said scanning lines;

said optical receiver comprising a row of photoelectric conversion elements to be disposed substantially parallel to said scanning lines, wherein said first circuit means comprising:

a counter reset by said reset pulse for producing a count signal representative of the count of said clock pulses;

first differentiator for differentiating a single output signal supplied from said OR gate circuit to produce a first pulse at said second instant; and first gate circuit connected to said counter and enabled in response to said first pulse for allowing passage of said count signal representative of the count for said first interval as said interval signal;

said second circuit means comprising:

a NOT circuit for inverting said single output signal supplied from said OR gate circuit to produce an inverted output signal;

second differentiator for differentiating said single output signal to produce a second pulse at said third instant;

second gate circuit connected to said counter and enabled in response to said second pulse for allowing passage of said count signal representative of the count for a sum of said first and said second intervals as said length signal;

third circuit means comprising a plurality of flip-flop circuits connected to said comparator in correspondence to the respective photoelectric conversion elements, those of said flip-flop circuits being set to produce said width signals which correspond to the photoelectric conversion elements.

* * * * *